(12) United States Patent
Besson et al.

(10) Patent No.: US 9,937,753 B2
(45) Date of Patent: Apr. 10, 2018

(54) TIRE COMPRISING A CROWN REINFORCEMENT

(75) Inventors: Jacques Besson, Clermont-Ferrand (FR); Aurore Lardjane, Clermont-Ferrand (FR); François Dimier, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 636 days.

(21) Appl. No.: 14/238,419

(22) PCT Filed: Aug. 3, 2012

(86) PCT No.: PCT/EP2012/065220
§ 371 (c)(1),
(2), (4) Date: Mar. 21, 2014

(87) PCT Pub. No.: WO2013/023937
PCT Pub. Date: Feb. 21, 2013

(65) Prior Publication Data
US 2014/0196827 A1    Jul. 17, 2014

(30) Foreign Application Priority Data
Aug. 12, 2011  (FR) ...................................... 11 57317

(51) Int. Cl.
*B60C 9/18* (2006.01)
*B60C 1/00* (2006.01)
(Continued)

(52) U.S. Cl.
CPC .............. *B60C 9/18* (2013.01); *B60C 9/0007* (2013.01); *B60C 9/185* (2013.01); *B60C 2001/0075* (2013.01); *Y10T 152/10801* (2015.01)

(58) Field of Classification Search
CPC ........... B60C 5/12; B60C 5/14; B60C 1/0008; B60C 9/185; B60C 2001/0075;
(Continued)

(56) References Cited

U.S. PATENT DOCUMENTS 8,453,694 B2 *   6/2013  Hahn .................... B60C 1/0008
2006/0032568 A1 *   2/2006  Lechtenboehmer .......... 152/510
(Continued)

FOREIGN PATENT DOCUMENTS

EP   2106930 A1   10/2009
EP   2123480 A2   11/2009
(Continued)

OTHER PUBLICATIONS

"Tire Cord", Kirk-Othmer Encyclopedia of Chemical Technology, Fourth Edition, vol. 24, John Wiley & Sons, 1997, pp. 169-170.*
(Continued)

*Primary Examiner* — Adrienne C Johnstone
(74) *Attorney, Agent, or Firm* — Dickinson Wright PLLC (57) ABSTRACT

The invention relates to a tire comprising a crown reinforcement formed of at least two working crown layers of reinforcing elements the ends of which are radially uncoupled by a polymer compound. According to the invention, the reinforcing elements of at least one working crown layer are metal cords with saturated layers, at least one internal layer being sheathed with a layer consisting of a polymer composition such as a rubber composition and in each of the shoulders of the tire, at least the uncoupling polymer compound in contact with the ends of at least two
(Continued)

working crown layers exhibits, in the sorption test, a gas content lower than $0.06 \, m^3{}_{STP}/m^3{}_{ML}$.

7 Claims, 2 Drawing Sheets

(51) Int. Cl.
  *B60C 9/20* (2006.01)
  *B60C 9/00* (2006.01)

(58) Field of Classification Search
  CPC ..... B60C 2001/0066; B60C 2009/2061; Y10T 152/1081
  USPC .......................................... 152/510, 532, 537
  See application file for complete search history.

(56) References Cited

U.S. PATENT DOCUMENTS

2008/0128065 A1* 6/2008 Sandstrom ................... 152/510
2009/0101266 A1 4/2009 Barguet et al.
2009/0283194 A1 11/2009 Hashimoto et al.
2010/0024944 A1 2/2010 Harikae

FOREIGN PATENT DOCUMENTS

| FR | 2873721 A1 | 2/2006 |
| FR | 2 978 939 A1 * | 2/2013 |
| WO | 2006013077 A1 | 2/2006 |

OTHER PUBLICATIONS

FR1157317, filed Aug. 12, 2011, French Search Report, dated Apr. 13, 2012, 8 pgs.

PCT/EP2012/065220, filed Aug. 3, 2012, International Search Report (ISR), Form PCT/ISA/210, dated Sep. 20, 2012 (including English translation), 5 pgs.

* cited by examiner

TIRE COMPRISING A CROWN REINFORCEMENT

This application claims benefit of the filing date of PCT/EP2012/065220, filed Aug. 3, 2012, which claims the benefit of FR1157317, filed Aug. 12, 2011.

1. FIELD

The present invention relates to a tire with a radial carcass reinforcement and more particularly to a tire intended to be fitted to vehicles carrying heavy loads and driving at sustained speed, such as, for example, lorries, tractors, trailers or buses.

2. DESCRIPTION OF RELATED ART

In general, in tires of the heavy goods type, the carcass reinforcement is anchored on either side in the bead zone and is surmounted radially by a crown reinforcement consisting of at least two layers which are superposed and formed of threads or cords which are parallel within each layer and crossed from one layer to the next making with the circumferential direction angles comprised between 10° and 45°. The said working layers, that form the working reinforcement, may also be covered by at least one layer referred to as a protective layer and which is formed of reinforcing elements that are advantageously made of metal and extensible, referred to as elastic elements. It may also comprise a layer of low extensibility metal threads or cords making with the circumferential direction an angle comprised between 45° and 90°, this ply, referred to as the triangulation ply, being situated radially between the carcass reinforcement and the first crown ply referred to as a working ply, formed of threads or cords which are parallel and are at angles at most equal to 45° in absolute terms. The triangulation ply forms with at least the said working ply a triangulated reinforcement which, under the various stresses that it is subjected to, exhibits very little by way of deformation, the triangulation ply having the essential role of reacting transverse compression loadings to which all of the reinforcing elements in the crown region of the tire are subjected.

In the case of tires for heavy goods vehicles, just one protective layer is usually present and its protective elements are, in most cases, oriented in the same direction and at the same angle in absolute terms as the reinforcing elements of the radially outermost and therefore radially adjacent working layer. In the case of construction plant tires intended to run on somewhat even ground, the presence of two protective layers is advantageous, the reinforcing elements being crossed from one layer to the next and the reinforcing elements of the radially inner protective layer being crossed with the inextensible reinforcing elements of the radially outer working layer adjacent to the said radially inner protective layer.

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane containing the axis of rotation of the tire.

The circumferential median plane or equatorial plane is a plane perpendicular to the axis of rotation of the tire and which divides the tire into two halves.

During the manufacture of such tires, the last step is to cure the tire in order to allow the various polymer compounds of which the tire is made to crosslink and/or become vulcanized. This step of curing the tire is a step which immobilizes the tire for a few minutes and in that respect is considered to be a step of great relevance to the productivity of the manufacture of a tire. Furthermore, this step, which is carried out at high temperature, consumes energy.

The curing time is notably imposed by the time needed to obtain constituent materials with the desired properties in the knowledge that crosslinking and/or vulcanizing does not occur in the same way for compounds that are radially or axially visible as it does for compounds on the inside. Likewise, crosslinking and/or vulcanizing varies according to the nature and thickness of the compounds.

It is also known that it is necessary to lengthen these curing times in order to avoid bubbles appearing within the polymer compounds, notably at the shoulders of the tire, at the axial ends of the crown reinforcement.

It is known that these zones of the tire which are among the thickest are made up of compounds the vulcanizing times of which are among the longest and which therefore contribute towards dictating minimum vulcanizing times for the overall curing of the tire.

Although for tire operation shorter curing times may prove sufficient, it has actually been found that it is necessary to lengthen these times in order to ensure that no bubbles form in the polymer compounds of which these zones are made. For the purposes of this disclosure, a thread is defined as an individual metal wire only when reciting a particular "thread" diameter, and a strand of metal wires twisted together when not describing the thread diameter.

The inventors have therefore set themselves the task of providing tires for heavy goods vehicles the cost of manufacture of which tires are reduced.

SUMMARY

This objective has been achieved according to embodiments of the invention using a tire with a radial carcass reinforcement, consisting of at least one layer of reinforcing elements, the said tire comprising a crown reinforcement formed of at least two working crown layers of reinforcing elements which are crossed from one layer to the other making with the circumferential direction angles of between 10° and 45° and the ends of which are radially uncoupled by a polymer compound, which layer is itself capped radially by a tread, the said tread being connected to two beads via two sidewalls, the reinforcing elements of at least one working crown layer being metal cords with saturated layers, at least one internal layer being sheathed with a layer consisting of a polymer composition such as a rubber composition and, in each of the shoulders of the tire, at least the uncoupling polymer compound in contact with the ends of the said at least two working crown layers exhibits, in the sorption test, a gas content lower than 0.06 $m^3{}_{STP}/m^3{}_{ML}$.

Layers that are coupled should be understood to mean layers the respective reinforcing elements of which are separated radially by at most 1.5 mm, the said thickness of rubber being measured radially between the respectively upper and lower generatrices of the said reinforcing elements.

According to the embodiments of the invention, an uncoupling polymer compound is a polymer compound positioned radially between the ends of the working crown layers which ensures a minimum radial distance of 1.5 mm between the respective reinforcing elements of each of the working layers.

The units used for gas content $m^3_{STP}/m^3_{ML}$ stand for cubic meters of gas under standard temperature and pressure conditions for one cubic meter of compound. The standard conditions are a temperature of 273.15 K and a pressure of 1 bar.

The dissolved gas content is defined by the solubility of the compound this being assessed by an absorption measurement as described hereinafter.

The test referred to as the sorption test makes it possible to determine the air solubility of the compound tested by measuring the volume of air that penetrates a test specimen under constant pressure over a given length of time. The principle behind the test is to saturate a compound with gas at a given pressure.

The test is performed on molded and vulcanized test specimens or on test specimens which have been extracted, by stripping, from vulcanized rubber compounds of at least two working crown layers.

The test on molded test specimens is performed on a test specimen 3 mm thick and 25 cm in diameter, molded in the bottom of a mold with perfect contact with the bottom of the mold. The mold has a diameter of 25 cm and a depth of 4 mm making it possible therefore, once the test specimen has been positioned, to have a free volume 25 cm in diameter and 1 mm thick available. The measurement is carried out at 150° C. A sustained vacuum lasting for two days is created in order to extract the gas from the compound and from the free volume (this step brings us to an initial pressure value close to zero). A quantity of gas is then injected into the enclosure by applying a pressure of 3 bar for 10 seconds. The pressure in the enclosure is then monitored over time until it stabilizes. Its decay corresponds to the absorption of gas into the compound. The solubility value is extracted from the pressure value reached at equilibrium and is expressed in $bar^{-1}$.

The solubility value is obtained using the following relationship:

$$S = -\frac{V_{enc}}{V_{ML}} \frac{T}{T_0} \frac{P^{t=0}_{enc} - P^{equilibrium}}{P^{t=0}_{ML} - P^{equilibrium}} \frac{1}{P_0}$$

where $V_{enc}$ is the free volume of the enclosure ($mm^3$)
$V_{ML}$ is the volume of the specimen of compound ($mm^3$)
T is the test temperature (423.15 K)
$T_0$ is the STP temperature (273.15 K)
$P^{t=0}_{enc}$ is the initial pressure in the enclosure (close to 0 bar)
$P^{t=0}_{ML}$ is the initial pressure in the compound (close to 0 bar)
$P^{equilibrium}$ is the pressure reached at equilibrium (bar)
$P_0$ is the STP pressure (1.01325 bar).

The test on extracts, obtained after stripping, is performed on a defined quantity of extracts expressed in $mm^3$ and placed in the bottom of the mold. The mold has a diameter of 25 cm and a depth of 4 mm thus making it possible, once the test specimen has been positioned, to have available a free volume obtained by subtracting the total volume minus the volume of extract. The measurement is taken at 150° C. A sustained vacuum lasting 2 days is created in order to extract the gas from the compound and from the free volume (this step brings us to an initial pressure value close to zero). A quantity of gas is then injected into the enclosure by applying 3 bar of pressure for 10 seconds. The pressure in the enclosure is then monitored over time until it stabilizes. Its decay corresponds to the absorption of gas into the compound. The solubility value is extracted from the pressure value reached at equilibrium and is expressed in $bar^{-1}$.

The rubber composition that forms the sheath around at least one internal layer of the said metal cords of at least one working crown layer can be non-crosslinkable, crosslinkable or crosslinked and is preferably based on at least one diene elastomer.

A "diene" elastomer or rubber means, in the known way, an elastomer derived at least in part (i.e. a homopolymer or a copolymer) from diene monomers (monomers which have two carbon-carbon double bonds, conjugated or unconjugated).

Cords referred to as "layered cords" or "multilayers" are cords made up of a central core and of one or more practically concentric layers of strands or threads arranged around this central core.

According to the embodiments of the invention, a saturated layer of a layered cord is a layer made up of threads in which there is not enough space to add to it at least one additional thread.

Metal cords with saturated layers, at least one internal layer of which is sheathed with a layer consisting of a polymer composition such as a rubber composition, return a zero flow rate on what is known as the permeability test.

The test referred to as the permeability test makes it possible to determine the longitudinal permeability of the tested cords to air by measuring the volume of air passing through a test specimen under constant pressure over a given length of time. The principle behind such a test, which is well known to those skilled in the art, is to demonstrate the effectiveness of the treatment applied to a cord in making it impermeable to air; it has been described for example in standard ASTM D2692-98.

The test is carried out on cords extracted directly, by stripping, from the vulcanized rubber plies that they reinforce, and which have therefore been penetrated with cured rubber.

The test is carried out on a 2 cm length of cord, which is therefore coated with its surrounding rubber composition (or coating rubber) in the cured state, as follows: air is injected into the inlet end of the cord at a pressure of 1 bar and the volume of air at the outlet end is measured using a flow meter (calibrated for example for 0 to 500 $cm^3$/min). During measurement, the test specimen of cord is immobilized in a compressed seal (for example a seal made of dense foam or of rubber) so that only the amount of air passing through the cord from one end to the other along the longitudinal axis thereof is taken into consideration by the measurement; the air tightness of the seal itself is tested beforehand using a test specimen made of solid rubber, i.e. one with no cord.

The higher the longitudinal impermeability of the cord, the lower the mean air flow rate measured (averaged over 10 test specimens). Because the measurement is performed with a precision of ±0.2 $cm^3$/min, measured values of 0.2 $cm^3$/min or lower are considered to be zero; these correspond to a cord that can be qualified as airtight (completely airtight) along its axis (i.e. in its longitudinal direction).

This permeability test is also a simple way of indirectly measuring the extent to which a rubber composition has penetrated the cord. The higher the degree of penetration of the cord with the rubber, the lower the measured flow rate.

Cords which on what is referred to as the permeability test return a flow rate of less than 20 cm³/min have a degree of penetration higher than 66%.

The degree of penetration of a cord can also be estimated using the method described hereinafter. In the case of a layered cord, the method involves first of all eliminating the outer layer on a test specimen of a length of between 2 and 4 cm so that the sum of the lengths of rubber compound with respect to the length of the test specimen can then be measured in a longitudinal direction and along a given axis. These measurements of lengths of rubber compound exclude the spaces along this longitudinal axis that have not been penetrated. These measurements are repeated along three longitudinal axes distributed about the periphery of the test specimen and repeated for five test specimens of cord.

When the cord comprises several layers, the first, elimination, step is repeated on the layer which has newly become the outer layer and the lengths of rubber compound are measured again along the longitudinal axes.

A mean of all the ratios of lengths of rubber compound to lengths of test specimens thus determined is then calculated in order to define the degree of penetration of the cord.

The inventors have been able to demonstrate that a tire produced according to embodiments of the invention in this way can be manufactured at a lower cost compared with conventional practice. Notably for example it is possible to reduce the curing time of the said tire for given pressure and temperature conditions in the curing mold. The inventors have indeed been able to demonstrate that the use of reinforcing elements in the working crown plies which, according to the invention, are metal cords with saturated layers, at least one internal layer being sheathed with a layer consisting of a polymer composition, makes it possible, because of the presence of the sheath, to avoid the presence of air and therefore prevent bubbles from appearing at the end of curing.

The inventors have effectively demonstrated that any air that may be present in the reinforcing elements of the working layers of the crown reinforcement may form bubbles within the rubber compounds if these compounds are not rigid enough to confine the air within the said reinforcing elements. What actually happens is that during the curing phase any air present expands as a result of temperature and seeks to leave the reinforcing elements as soon as the molding pressure applied during curing disappears. If the rubber compounds are rigid enough, the air cannot leave the reinforcing elements. As explained hereinabove, this sufficient rigidity of the rubber compounds is usually obtained by lengthening the tire curing time.

The absence of air in the reinforcing elements of the working crown layers means that this curing time can be limited, it being possible for the rigidity of the rubber compounds when the molding pressure disappears to be lower than is usually required.

The inventors have also been able to demonstrate that when the invention is not carried out as described herein but reproducing only the feature relating to the reinforcing elements of the working crown layers, an excessive reduction in curing time causes the appearance of bubbles the diameter of which is smaller than that of the bubbles observed as mentioned previously. According to the inventors, these bubbles come from gases that may be present within the rubber compounds.

Carrying out the invention in its entirety, i.e. combining, on the one hand, the feature relating to the reinforcing elements of at least one working crown layer whereby these are metal cords with saturated layers, at least one internal layer being sheathed by a layer consisting of a polymer composition and, on the other hand, the feature whereby in each of the shoulders of the tire at least the uncoupling polymer compound in contact with the ends of at least two working crown layers have a gas content lower than 0.06 $m^3_{STP}/m^3_{ML}$, allows a substantial reduction in the tire curing time without quantities of bubbles capable of adversely affecting the performance of the tire being observed within the said polymer compounds near the ends of the said working crown layers.

As has just been explained, embodiments of the invention allows the manufacture of a tire which is less expensive overall by reducing the curing time because the overall productivity of a curing unit is improved.

According to embodiments of the invention, a tire produced according to the invention may also be manufactured at a lower cost compared with usual practice, for example by reducing the temperature during the step of curing the said tire for given pressure and time conditions in the curing mold, as the energy required for curing is then lower.

This economic saving can even rely on a combination of a reduction in the curing time and of a reduction in the temperature so as to alter both the productivity and the cost of energy.

The inventors have also demonstrated that when the choice leans towards reducing the curing time, embodiments of the invention further leads to an improvement in rolling resistance. This is because, as explained earlier, the appearance of bubbles in the compounds means that the tire curing times have to be lengthened beyond what is necessary for good tire operation. The inventors have demonstrated that this "overcuring" alters the hysteresis properties of the compounds. Thus, tires produced in accordance with the invention will, for a given use on a vehicle, make it possible to reduce the heating of the rubber compounds and notably those that make up the tread.

It will be noted that the sheath according to the invention extends continuously around the layer it covers (i.e. that this sheath is continuous in the "orthoradial" direction of the cord which is perpendicular to its radius) so that it forms a continuous sleeve of a cross section that is advantageously near-circular.

It will also be noted that the rubber composition of this sheath may be crosslinkable or crosslinked, i.e. that it by definition comprises a crosslinking system suited to allowing the composition to crosslink as it is cured (i.e. to harden rather than to melt); thus, this rubber composition can be qualified as non-meltable, because it cannot be melted by heating, whatever the temperature to which it is heated.

For preference, the rubber sheath crosslinking system is a system referred to as a vulcanizing system, i.e. one based on sulphur (or on a sulphur donor) and a vulcanization primary accelerator. Various known secondary accelerators or vulcanization activators may be added to this basic vulcanization system.

The rubber composition of the sheath according to embodiments of the invention contains, in addition to the said crosslinking system, all the usual ingredients that can be used in rubber compositions for tires, such as reinforcing fillers based on carbon black and/or on a reinforcing inorganic filler such as silica, anti-ageing agents, for example antioxidants, extension oils, plasticizers or processibility agents that make the compositions easier to process in the raw state, methylene acceptors and donors, resins, bismaleimides, known adhesion promoters of the "RFS" (resorcinol-formaldehyde-silica) type or metal salts, notably cobalt salts.

By way of preference, the composition of this sheath is chosen to be identical to the composition used for the rubber matrix that the cords according to embodiments of the invention are intended to reinforce. Thus, there is no problem of potential incompatibility between the respective materials of the sheath and of the rubber matrix.

According to an alternative form of the invention, the said cords of at least one working crown layer are cords with layers of construction [L+M], comprising a first layer C1 of L threads of diameter $d_1$ wound together in a helix at a pitch $p_1$ with L ranging from 1 to 4, which is surrounded by at least one intermediate layer C2 of M threads of diameter $d_2$ wound together in a helix at a pitch $p_2$ with M ranging from 3 to 12, a sheath constituted by a rubber composition that is non-crosslinkable, crosslinkable or crosslinked, based on at least one diene elastomer, covering, in the construction, the said first layer C1.

For preference, the diameter of the threads of the first layer of the internal layer (C1) is comprised between 0.10 and 0.5 mm and the diameter of the threads of the external layer (C2) is comprised between 0.10 and 0.5 mm.

For preference also, the pitch $p_2$ of the helix at which the said threads of the external layer (C2) are wound is comprised between 8 and 25 mm.

Within the meaning of the disclosure, the helix pitch represents the length, measured parallel to the axis of the cord, after which a thread of this pitch has made a complete turn about the axis of the cord; thus, if the axis is sectioned on two planes perpendicular to the said axis and separated by a length equal to the pitch of a thread of a layer of which the cord is made, the axis of this thread has, in these two planes, the same position on the two circles corresponding to the layer of the thread in question.

Advantageously, the cord has one, and more preferably still all, of the following features satisfied:
- the layer C2 is a saturated layer, i.e. there is not enough space in this layer to add to it at least one (N+1)th thread of diameter $d_2$, N then representing the maximum number of threads that can be wound in a layer around the layer C1; the rubber sheath also covers the internal layer C1 and/or separates adjacent pairs of threads of the external layer C2;
- the rubber sheath covers practically all of the radially internal half-circumference of each thread of the layer C2 so that it separates adjacent pairs of threads of this layer C2.

For preference, the rubber sheath has a mean thickness ranging from 0.010 mm to 0.040 mm.

In general, the said cords according to embodiments of the invention may be produced with any type of metal thread, notably made of steel, for example carbon steel threads and/or stainless steel threads. Use is preferably made of a carbon steel but it is of course possible to use other steels or other alloys.

When a carbon steel is used, its carbon content (wt % of steel) is preferably comprised between 0.1% and 1.2%, more preferably from 0.4% to 1.0%; these contents represent a good compromise between the mechanical properties required for the tire and the workability of the thread. It should be noted that a carbon content comprised between 0.5% and 0.6% ultimately makes such steels less expensive because they are easier to draw. Another advantageous embodiment of the invention may also, depending on the target application, involve using steels with a low carbon content, comprised for example between 0.2% and 0.5%, notably on account of the lower cost and greater ease of drawing.

The said cords according to embodiments of the invention can be obtained using various techniques known to those skilled in the art, for example in two steps, first of all by using an extrusion head to sheath the core or layers C1, which step is followed in a second step by a final operation of cabling or twisting the remaining M threads (layer C2) around the layer C1 thus sheathed. The problem of tack in the raw state presented by the rubber sheath during potential intermediate operations of spooling and unspooling may be resolved in a way known to those skilled in the art, for example by use of a plastic interlayer film.

Such cords of at least one working crown layer are, for example, chosen from the cords described in patent applications WO 2006/013077 and WO 2009/083212.

According to a first embodiment of the invention, at least the uncoupling polymer compound in contact with the ends of the said at least two working crown layers is an elastomeric compound based on natural rubber or on synthetic polyisoprene containing a majority of cis-1,4 sequences and possibly on at least one other diene elastomer, the natural rubber or the synthetic polyisoprene in the case of a cut, being present in a predominant proportion in relation to the proportion of the other diene elastomer or elastomers used and of a reinforcing filler consisting:
  (i) either of carbon black with a BET specific surface area lower than 60 m$^2$/g, used in a proportion comprised between 20 and 80 phr, and preferably between 40 and 60 phr,
  (ii) or of a white filler of silica and/or alumina type containing SiOH and/or AlOH surface functions selected from the group consisting of precipitated or pyrogenated silicas, aluminas or alumino silicates or alternatively still carbon blacks modified during the course of or after synthesis with a specific surface comprised between 30 and 260 m$^2$/g used at a proportion comprised between 20 and 80 phr, and preferably between 40 and 60 phr,
  (iii) or of a cut of carbon black described at (i) and a white filler described at (ii), in which cut the overall proportion of filler is comprised between 20 and 80 phr, and preferably between 40 and 60 phr.

The BET specific surface area is measured using the BRUNAUER, EMMET and TELLER method described in "The Journal of the American Chemical Society", vol. 60, page 309, February 1938, corresponding to standard NFT 45007, November 1987.

In the case of the use of clear filler, it is necessary to use a coupling and/or covering agent selected from the agents known to those skilled in the art. By way of examples of preferred coupling agents, mention may be made of sulphur-containing alkoxysilanes of the bis-(3-trialcoxysilylpropyl) polysulphide type, and of these notably bis-(3-triethoxysilylpropyl) tetrasulphide marketed by the DEGUSSA company under trade names Si69 in the case of the pure liquid product, and X50S in the case of the solid product (a 50/50 cut by weight with black N330). By way of examples of covering agents, mention may be made of a fatty alcohol, an alkylalcoxysilane such as hexadecyltrimethoxy or triethoxysilane respectively marketed by the DEGUSSA company under trade names Si116 and Si216, diphenylguanidine, a polyethylene glycol, a silicone oil possibly modified with OH or alcoxy functional groups. The covering and/or coupling agent is used in a proportion by weight with respect to the filler≥1/100 and ≤20/100, and preferably comprised between 2/100 and 15/100 when the clear filler represents all of the reinforcing filler and comprised between 1/100 and 20/100 when the reinforcing filler consists of a cut of carbon black and clear filler.

By way of other examples of reinforcing fillers that have the morphology and the SiOH and/or AlOH surface functional groups of the materials of the silica and/or alumina type described earlier and that can be used according to the invention as a full or partial replacement for these materials, mention may be made of carbon blacks modified either during synthesis by the addition to the furnace stock oil of a compound of silicon and/or of aluminium or after synthesis by adding an acid to an aqueous suspension of carbon black in a solution of sodium silicate and/or aluminate so as to at least partially cover the surface of the carbon black with SiOH and/or AlOH functional groups. By way of nonlimiting examples of this type of carbon-containing filler with SiOH and/or AlOH functional groups at the surface, mention may be made of the CSDP-type fillers described in paper No. 24 of the ACS Rubber Division Meeting, Anaheim, Calif., 6-9 May 1997 and those of patent application EP-A-0 799 854.

When a clear filler is used as the only reinforcing filler, the hysteresis and cohesion properties are obtained by using a precipitated or pyrogenated silica or alternatively a precipitated alumina or alternatively still, an aluminosilicate with a BET specific surface area comprised between 30 and 260 $m^2/g$. By way of nonlimiting examples of this type of filler, mention may be made of silicas KS404 by the company Akzo, Ultrasil VN2 or VN3 and BV3370GR by the company Degussa, Zeopol 8745 by the company Huber, Zeosil 175 MP or Zeosil 1165 MP by the company Rhodia, HI-SIL 2000 by the company PPG, etc.

Of the diene elastomers that can be used as a cut with natural rubber or a synthetic polyisoprene with a predominance of cis-1,4 sequences, mention may be made of a polybutadiene (BR) preferably with a predominance of cis-1,4 sequences, a stirene-butadiene copolymer (SBR) solution or emulsion, a butadiene-isoprene copolymer (BIR) or alternatively still, a stirene-butadiene-isoprene (SBIR) terpolymer. These elastomers may be elastomers that are modified during the polymerization process or after polymerization using branching agents such as divinylbenzene or star-forming agents such as carbonates, halogen-tin compounds, halogen-silicon compounds or alternatively still, functionalization agents that lead to a grafting onto the chain or onto the end of the chain of oxygenated carbonyl, carboxyl functions or alternatively of an amine function such as, for example, by action of dimethyl or of diethylamino benzophenone. In the case of cuts of natural rubber or of synthetic polyisoprene containing a predominance of cis-1,4 sequences with one or more diene elastomers, as mentioned hereinabove, the natural rubber or the synthetic polyisoprene is preferably used at a predominant proportion and more preferably still, in a proportion higher than 70 phr.

According to this first embodiment of the invention, the uncoupling polymer compound in contact with the ends of at least two working crown layers has a reduced amount of dissolved gas by comparison with the usual compounds for this type of application in the tire.

Such compounds which are known to those skilled in the art are not usually used for this function because of their low level of cohesion when the region of the tire at the ends of the working crown layers is heated. The inventors have further been able to demonstrate that an improved heating-cohesion compromise was achieved with tires produced in this way according to embodiments of the invention. Specifically, the improvements obtained as far as the hysteresis properties of the various compounds of which the tire is made caused by the shorter curing time are concerned make it possible to limit the heating of the zone of the tire at the ends of the working crown layers for a given usage, and thus make it possible to improve the cohesion of the compounds described hereinabove and maintain satisfactory tire endurance.

Another embodiment of the invention that makes it possible to obtain uncoupling polymer compounds in contact with the ends of at least two working crown layers having a reduced amount of dissolved gas by comparison with the conventional compounds for this type of application in the tire may consist in stoving the said compounds, whatever their composition, just before setting them in position during the manufacture of the tire. However, such an alternative form of embodiment proves to be more complex in terms of a manufacturing process.

According to either of these embodiments of the invention, the choice of uncoupling polymer compound may be validated by measuring the "bubble formation limit" using a test described hereinafter, the "bubble formation limit" having to be below 2 min.

The test involves curing a test specimen of raw compound of a diameter of 36 mm and a thickness of 3 mm in a mold held at a pressure of 16 bar at a temperature of 145° for a certain length of time. The "bubble formation limit" is the time needed beyond which bubbles do not form within the compounds. This measurement allows the sensitivity of the mixture to forming bubbles to be estimated in relative terms, and is therefore compromised between the amount of gas available at high temperature within the material and the ability of the compound to vulcanize.

According to one or other of these embodiments of the invention, the choice of uncoupling polymer compound may further be validated by a "critical" pressure measurement using a test described hereinafter, the "critical" pressure having to be below 1.25 bar.

The test involves curing a test specimen of raw compound of a diameter of 36 mm and a thickness of 3 mm in a mold held at a certain pressure at a temperature of 145° for 20 minutes. The "critical" pressure is the pressure beyond which bubbles do not form within the compounds. This measurement allows the amount of gas available at high temperature within the material to be assessed in relative terms.

According to an alternative form of embodiment of the invention, at least the uncoupling polymer compound in contact with the ends of at least two working crown layers is a compound of which the rigidity prior to the curing phase, or rigidity in the raw state, is greater than that of the usual compounds used for this type of application in the tire.

According to another alternative form of embodiment of the invention, at least the uncoupling polymer compound in contact with the ends of at least two working crown layers is a compound for which the fixing time or the delay phase, i.e. the time before the start of vulcanization during the curing phase, is shorter than that of the usual compounds used for this type of application in the tire. These times may notably vary according to the dimensions and makeup of the tires.

According to other forms of embodiment of the invention, at least the uncoupling polymer compound in contact with the ends of at least two working crown layers is obtained by combining a polymer compound that has a reduced amount of dissolved gas in comparison with the usual compounds and/or a polymer compound of which the rigidity prior to the curing phase, or rigidity in the raw state, is higher than that of the usual compounds and/or a polymer compound the fixing time of which is shorter than that of the usual compounds.

According to other alternative forms of embodiment of the invention, the crown reinforcement also comprises at least one layer of circumferential reinforcing elements.

One preferred embodiment of the invention also plans for the crown reinforcement to be supplemented radially on the outside by at least one additional layer, referred to as a protective layer, of reinforcing elements referred to as elastic reinforcing elements, oriented with respect to the circumferential direction at an angle comprised between 10° and 45° and in the same sense as the angle formed by the inextensible elements of the working layer radially adjacent to it.

The protective layer may have an axial width shorter than the axial width of the narrowest working layer. The said protective layer may also have an axial width greater than the axial width of the narrowest working layer, such that it covers the edges of the narrowest working layer and, in the case of the radially upper layer being the narrower, such that it is coupled, in the axial continuation of the additional reinforcement, to the widest working crown layer over an axial width and is then, axially on the outside, uncoupled from the said widest working layer by profiled elements at least 2 mm thick. The protective layer formed of elastic reinforcing elements may, in the above-mentioned case, be on the one hand potentially uncoupled from the edges of the said narrowest working layer by profiled elements of significantly smaller thickness than the thickness of the profiled elements separating the edges of the two working layers, and on the other hand have an axial width that is less than or greater than the axial width of the widest crown layer.

According to any one of the embodiments of the invention mentioned hereinabove, the crown reinforcement may also be supplemented, radially on the inside between the carcass reinforcement and the radially inner working layer closest to the said carcass reinforcement, by a triangulation layer of inextensible metal reinforcing elements made of steel which, with the circumferential direction, make an angle in excess of 60° in the same sense as the angle formed by the reinforcing elements of the radially closest layer of the carcass reinforcement.

The reinforcing elements of these crown layers such as notably those of the protective layers or of the triangulation layers may be similar to those described hereinabove in respect of the working crown layers.

According to one preferred embodiment of the invention, the reinforcing elements of at least one layer of the carcass reinforcement are metal cords exhibiting in what is known as the permeability test a flow rate lower than 20 cm$^3$/min.

The cords of the carcass reinforcement which are subjected to "fretting-fatigue-corrosion" phenomena may thus offer better resistance to these wear and fatigue phenomena and therefore contribute to improving the endurance of the tire notably when used under extreme conditions.

For preference also, the cords of at least one layer of the carcass reinforcement return, on what is known as the permeability test, a flow rate of less than 10 cm$^3$/min and more preferably still of less than 2 cm$^3$/min.

According to one advantageous embodiment of the invention, the said metal reinforcing elements which, on what is known as the permeability test, return a flow rate of less than 20 cm$^3$/min of at least one layer of the carcass reinforcement are cords having at least two layers, at least one internal layer being sheathed by a layer consisting of a polymer composition such as a composition of non-crosslinkable, crosslinkable or crosslinked rubber, preferably based on at least one diene elastomer. The said cords therefore on what is referred to as the permeability test return a zero flow rate.

According to an alternative form of the invention, the reinforcing elements of at least one layer of the carcass reinforcement which on what is referred to as the permeability test return a flow rate of less than 20 cm$^3$/min are layered metal cords of construction [L+M] or [L+M+N], comprising a first layer C1 with L threads of diameter $d_1$ wound together in a helix at a pitch $p_1$ with L ranging from 1 to 4, surrounded by at least one intermediate layer C2 of M threads of diameter $d_2$ wound together in a helix at a pitch $p_2$ with M ranging from 3 to 12, the said layer C2 potentially being surrounded by an external layer C3 of N threads of diameter $d_3$ wound together in a helix at a pitch $p_3$ with N ranging from 8 to 20, a sheath made of a polymer composition such as a composition of non-crosslinkable, crosslinkable or crosslinked rubber based on at least one diene elastomer covering, in the [L+M] construction, the said first layer C1 and, in the [L+M+N] construction, at least the said layer C2.

In the case of a carcass reinforcement comprising several layers of reinforcing elements, each of the said layers may comprise such cords. Advantageously, at least the radially outer layer comprises metal cords which, on what is referred to as the permeability test, return a flow rate of less than 20 cm$^3$/min.

BRIEF DESCRIPTION OF THE DRAWINGS

Other details and advantageous features of the invention will emerge hereinafter from the description of some embodiments of the invention given with reference to FIGS. 1 to 3 which depict.

DETAILED DESCRIPTION OF SPECIFIC EMBODIMENTS

In order to make them easier to understand, the figures have not been drawn to scale.

Figure 1:
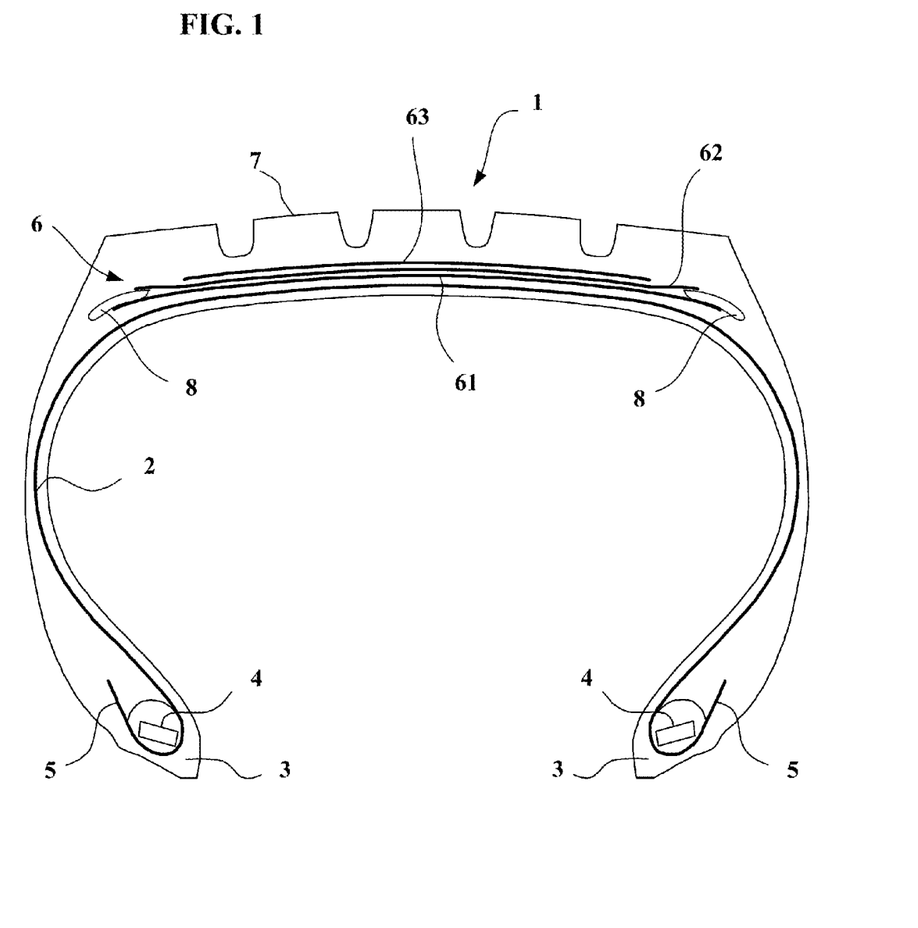
FIG. 1: a meridian view of a diagram of a tire according to one embodiment of the invention.

In FIG. 1, the tire 1, of size 315/80 R 22.5, comprises a radial carcass reinforcement 2 anchored in two beads 3. The carcass reinforcement 2 is formed of a single layer of metal cords wound around a bead wire 4 to form a turn-up 5. The carcass reinforcement 2 is wrapped by a crown reinforcement 6 itself capped by a tread 7. The crown reinforcement 6 is formed radially from the inside to the outside:

of a first working layer 61 formed of 3+9×0.30 unwrapped inextensible metal cords according to the invention, continuous across the entire width of the ply, and oriented at an angle equal to 18°, of a second working layer 62 formed of 3+9×0.30 unwrapped inextensible metal cords according to the invention, continuous across the entire width of the ply, oriented at an angle equal to 18° and crossed with the metal cords of the first working layer, of a protective layer 63 formed of 3×2×0.35 elastic metal cords.

The carcass reinforcing layer 2 is wound around a bead wire 4 to form a turn-up 5.

The ends of the working layers 61 and 62 are uncoupled by profiled elements of rubber compound 8.

According to embodiments of the invention, the profiled elements of rubber compound 8 have the following composition:

| | COMPOSITION (in parts per 100 rubber) |
|---|---|
| Natural rubber | 100 |
| Black N683 | 56 |
| Cobalt abietate | 4.5 |
| Antioxidant (6PPD) | 1.8 |
| Stearic acid/zinc oxide | 0.6/7.5 |
| Sulphur/accelerant (DCBS) | 5.6/0.8 |
| Critical pressure | 0.75 bar |

The black N683 has a BET specific surface area equal to 37 m²/g. The reference for the black corresponds to an ASTM grade.

The table above also indicates the critical pressure of the rubber compound 8 which is indicative of the amount of gas contained in the compound.

The profiled elements of rubber compound 8 exhibit, on the sorption test, a gas content equal to 0.045 $m^3_{STP}/m^3_{ML}$.

Figure 2:
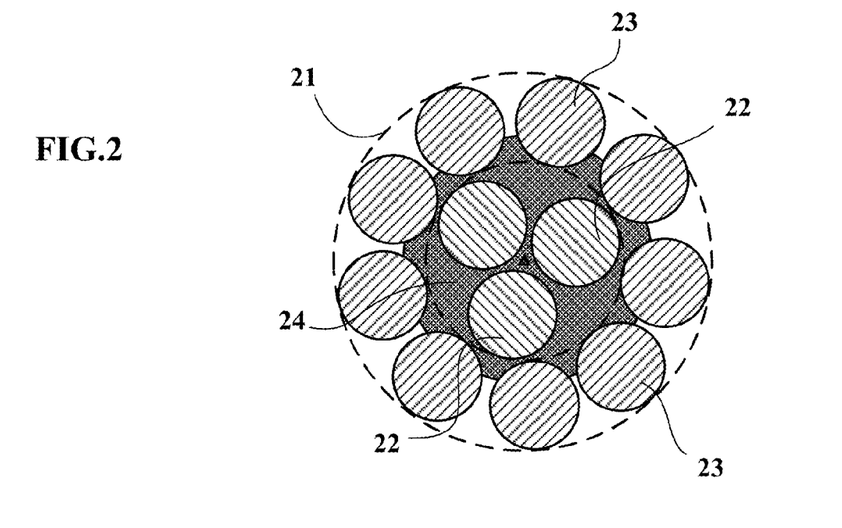
FIG. 2: a schematic depiction of a view in cross section of a first example of a working layer cord of the tire of FIG. 1.

FIG. 2 is a schematic depiction of the cross section of a cord 21 of a working layer of the crown reinforcement that can be used in a tire according to an embodiment of the invention. This cord 21 is an unwrapped layered cord of 3+9 structure made up of a central core formed of a cord made up of three threads 22 twisted together and of an external layer formed of nine threads 23.

It has the following characteristics (with d and p in mm):
structure 3+9;
$d_1$=0.30 (mm);
$p_1$=15.4 (mm)
$(d_1/d_2)$=1;
$d_2$=0.30 (mm);
$p_2$=15.4 (mm),
where $d_1$, $p_1$ are respectively the diameter and the helix pitch of the threads of the central core and $d_2$ and $p_2$ are respectively the diameter and the helix pitch of the threads of the external layer.

The central core consisting of a cord formed of the three threads 22 was sheathed with a rubber composition 24 based on a diene elastomer which was unvulcanized (in the raw state). Sheathing was performed using an extrusion head of the cord 22, followed by a final operation of cabling the 9 threads 23 around the core thus sheathed.

The penetrability of the cord 31, as measured using the method described hereinabove, is equal to 95%.

Figure 3:
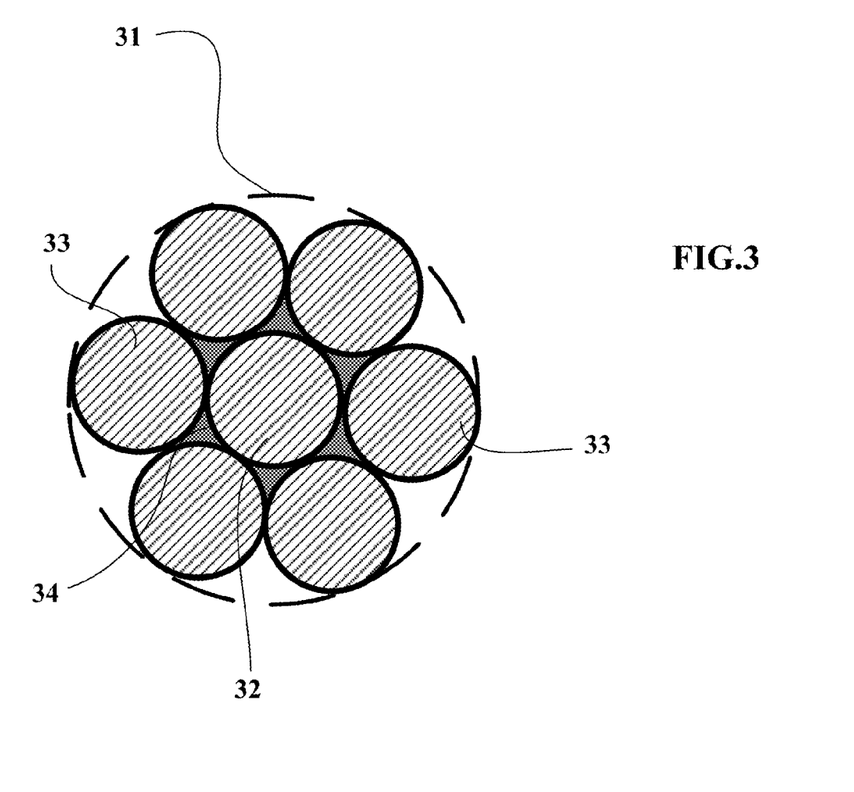
FIG. 3: a schematic depiction of a view in cross section of a second example of a working layer cord of the tire of FIG. 1.

FIG. 3 is a schematic depiction of the cross section of another cord 31 of a working layer of the crown reinforcement that can be used in a tire according to the invention. This cord 31 is an unwrapped layered cord of 1+6 structure, consisting of a central core formed of one thread 32 and of an external layer formed of six threads 33.

It has the following characteristics (with d and p in mm):
structure 1+6;
$d_1$=0.35 (mm);
$(d_1/d_2)$=1;
$d_2$=0.35 (mm);
$p_2$=15.4 (mm),
where $d_1$ is the diameter of the core and $d_2$ and $p_2$ are respectively the diameter and the helix pitch of the threads of the external layer.

The central core consisting of the thread 32 was sheathed with a rubber composition 34 based on a diene elastomer which was unvulcanized (in the raw state). Sheathing was performed via an extrusion head of the thread 32, followed by a final operation of cabling the 6 threads 33 around the core thus sheathed.

The penetrability of the cord 31, as measured using the method described hereinabove, is equal to 95%.

Tests were carried out using tires produced according to embodiments of the invention in accordance with the depiction of FIGS. 1 and 2 and other tests were carried out using tires referred to as reference tires.

The first reference tires differ from the tires according to embodiments of the invention by a crown reinforcement in which the reinforcing elements of the working layers are unwrapped 11.35 metal cords which have no sheathing layer. Unlike the cords according to the invention, these cords contain air.

First reference tires R1 also differ from the tires according to embodiments of the invention by profiled elements of rubber compound 8 having the following composition:

| | COMPOSITION (in parts per 100 rubber) |
|---|---|
| Natural rubber | 100 |
| Black N347 | 50 |
| Cobalt abietate | 4.5 |
| Antioxidant (6PPD) | 1.8 |
| Stearic acid/zinc oxide | 0.6/7.5 |
| Sulphur/accelerant (DCBS) | 5.6/0.8 |
| Critical pressure | 1.5 bar |

The black N347 has a BET specific surface area equal to 90 m²/g.

The profiled elements of rubber compound 8 exhibit, on the sorption test, a gas content equal to 0.075 $m^3_{STP}/m^3_{ML}$.

The second reference tires R2 differ from the tires according to embodiments of the invention by profiled elements of rubber compound 8 having a composition identical to that of the first reference tires.

The reinforcing elements of the working layers of these second reference tires are metal cords identical to those of the tires produced according to embodiments of the invention.

Curing tests on the various tires were carried out in order to determine the minimum possible length of time without bubbles appearing within the rubber compounds at the ends of the working layers.

The results are given in the following table:

| Tires | Curing time (in minutes) |
|---|---|
| R1 | 40.5 |
| R2 | 36 |
| Invention | 34.5 |

It is evident from this example that the savings made according to embodiments of the invention, which combines firstly the characteristic relating to the reinforcing elements of the working crown layers as being metal cords with saturated layers, at least one internal layer being sheathed with a layer consisting of a polymer composition such as a rubber composition and, on the other hand, the characteristic whereby in each of the shoulders of the tire at least one polymer compound in contact with the ends of at least two working crown layers which, on the sorption test, exhibits a gas content lower than 0.06 $m^3{}_{STP}/m^3{}_{ML}$, make it possible to reduce the curing time of the tires by the order of 15% by comparison with conventional tires corresponding to the reference tires R1 without any bubble being seen to appear within the said polymer compounds near the ends of the said working crown layers.

Moreover, it should be noted that in the case of the reference tires R2, if the curing time is reduced below 36 minutes, a significant number of bubbles appear within the polymer compounds, the mean diameter of which bubbles is smaller than that of the bubbles that appear in the case of the reference tire R1 when the curing time is reduced below 40.5 minutes.

Endurance testing was carried out on a test machine that made each of the tires run in a straight line at a speed equal to the maximum speed index of the said tire under an initial load of 4000 kg, which was increased progressively in order to shorten the duration of the test.

The tests were carried out on the tires according to the invention with conditions identical to those applied to the reference tires R1.

The tests carried out lead, for the tires R1, to performance that established the base 100. The tests were stopped when tire degradation became apparent.

The results are given in the following table:

| Tire | Distance covered (in km) |
|---|---|
| R1 | 100 |
| Invention | 109 |

These results show that the tires according to the invention are at least as good as, if not slightly better than, the reference tires.

Rolling resistance measurements showed that the tires according to the invention lead, by comparison with the reference tires RE to an improvement of the order of 0.4 kg/T.

The measurements taken are summarized in the following table:

| Tire | Rolling resistance |
|---|---|
| R1 | 5.92 kg/T |
| Invention | 5.55 kg/T |

The invention claimed is:

1. A tire with a radial carcass reinforcement, comprising at least one layer of reinforcing elements, the tire comprising a crown reinforcement formed of at least two working crown layers of reinforcing elements which are crossed from one layer to the other making with the circumferential direction angles of between 10° and 45° and the ends of which are radially uncoupled by a polymer compound, the crown reinforcement is capped radially by a tread, the tread being connected to two beads via two sidewalls, wherein the reinforcing elements of at least one working crown layer are metal cords with saturated layers, at least one internal layer being sheathed with a layer consisting of a polymer composition and wherein, in each of the shoulders of the tire, at least the uncoupling polymer compound in contact with the ends of at least two working crown layers exhibits, in the sorption test, a gas content lower than 0.06 $m^3{}_{STP}/m^3{}_{ML}$.

2. The tire according to claim 1, wherein the said reinforcing elements of at least one working crown layer are metal cords with layers of construction L+M comprising a first layer C1 of L threads of diameter d1 wound together in a helix at a pitch p1 with L ranging from 1 to 4, which is surrounded by an external layer C2 of M threads of diameter d2 wound together in a helix at a pitch p2 with M ranging from 3 to 12, and wherein a sheath constituted by a rubber composition that is non-crosslinkable, crosslinkable or crosslinked, based on at least one diene elastomer, covers said first layer C1.

3. The tire according to claim 2, wherein the diameter of the threads of the first layer C1 is between 0.10 and 0.5 mm and wherein the diameter of the threads of the layer C2 is between 0.10 and 0.5 mm.

4. The tire according to claim 2, wherein the rubber sheath has a mean thickness ranging from 0.010 mm to 0.040 mm.

5. The tire according to claim 1, wherein at least the uncoupling polymer compound in contact with the ends of at least two working crown layers is an elastomeric compound based on natural rubber or on synthetic polyisoprene containing a majority of cis-1,4 sequences and optionally on at least one other diene elastomer, the natural rubber or the synthetic polyisoprene in the case of a cut, being present in a predominant proportion in relation to the proportion of the other diene elastomer or elastomers used and of a reinforcing filler consisting:
   (i) carbon black with a BET specific surface area lower than 60 $m^2/g$, used in a proportion comprised between 20 and 80 phr,
   (ii) a white filler of silica and/or alumina type containing SiOH and/or AlOH surface functions selected from the group consisting of precipitated or pyrogenated silicas, aluminas or alumino silicates or alternatively still carbon blacks modified during the course of or after synthesis with a specific surface comprised between 30 and 260 $m^2/g$ used at a proportion comprised between 20 and 80 phr, or
   (iii) a cut of carbon black described at (i) and a white filler described at (ii), in which cut the overall proportion of filler is between 20 and 80 phr.

6. The tire according to claim 1, wherein the crown reinforcement further comprises at least one layer of circumferential reinforcing elements.

7. The tire according to claim 1, wherein the reinforcing elements of at least one layer of the carcass reinforcement are metal cords exhibiting in what is known as the permeability test a flow rate lower than 20 $cm^3/min$.

* * * * *